United States Patent

Swisher et al.

[11] Patent Number: 5,817,952
[45] Date of Patent: Oct. 6, 1998

[54] OPPOSING TAPER-FIT COLLAR FOR ATTACHING A TORQUE SENSING TRANSDUCER TO A ROTATABLE SHAFT

[75] Inventors: William F. Swisher, Carthage, Ill.; Larry P. Brotherton, Fort Madison, Iowa

[73] Assignee: Methode Electronics, Inc., Chicago, Ill.

[21] Appl. No.: 673,439

[22] Filed: Jun. 28, 1996

[51] Int. Cl.⁶ .................................................. G01L 3/10
[52] U.S. Cl. ........................ 73/862.335; 73/862.333; 73/779
[58] Field of Search .................. 73/862.333, 862.334, 73/862.335; 403/371, 368, 334

[56] References Cited

U.S. PATENT DOCUMENTS

| | | | |
|---|---|---|---|
| 1,382,606 | 6/1921 | Norton | 403/371 |
| 4,367,053 | 1/1983 | Stratienko et al. | 403/371 |
| 4,760,745 | 8/1988 | Garshelis | 73/862.36 |
| 4,780,671 | 10/1988 | Hase et al. | 73/862.336 |
| 4,817,444 | 4/1989 | Yagi et al. | 73/862.335 |
| 4,896,544 | 1/1990 | Garshelis | 73/862.36 |
| 5,052,232 | 10/1991 | Garshelis | 73/862.36 |
| 5,255,567 | 10/1993 | Miyake et al. | 73/862.333 |
| 5,351,555 | 10/1994 | Garshelis | 73/862.335 |
| 5,353,649 | 10/1994 | Hase et al. | 73/862.333 |
| 5,517,878 | 5/1996 | Klein et al. | 403/371 |
| 5,520,059 | 5/1996 | Garshelis | 73/862.333 |

*Primary Examiner*—Ronald L. Biegel
*Attorney, Agent, or Firm*—Jeffrey H. Canfield

[57] ABSTRACT

A torque sensing transducer sleeve of the magnetostrictive type is attached to a rotatable shaft where torque is to be measured. A shaft is provided on which torque is to be applied and measured. A transducer sleeve of the magnetostrictive type for measuring the torque is attached to the shaft with a nonmagnetic collar interposed between the shaft and the transducer sleeve. The nonmagnetic collar is formed having a shape such that when the transducer sleeve, and the collar are properly positioned on the shaft, the nonmagnetic sleeve exerts circumferential tension on the transducer sleeve producing circular magnetic anisotropy within the transducer sleeve.

20 Claims, 6 Drawing Sheets

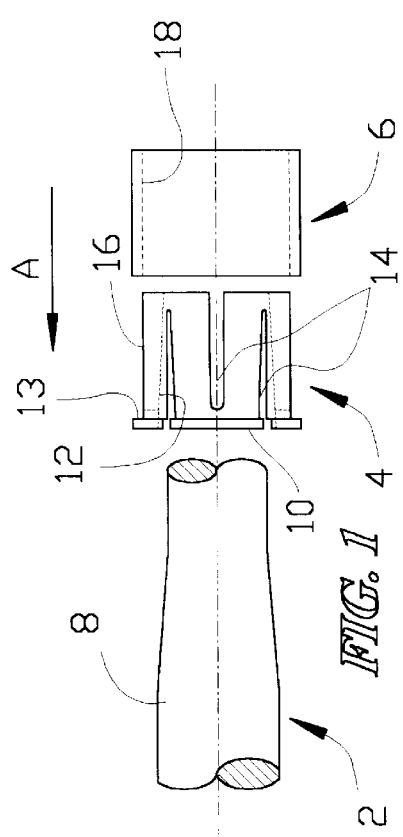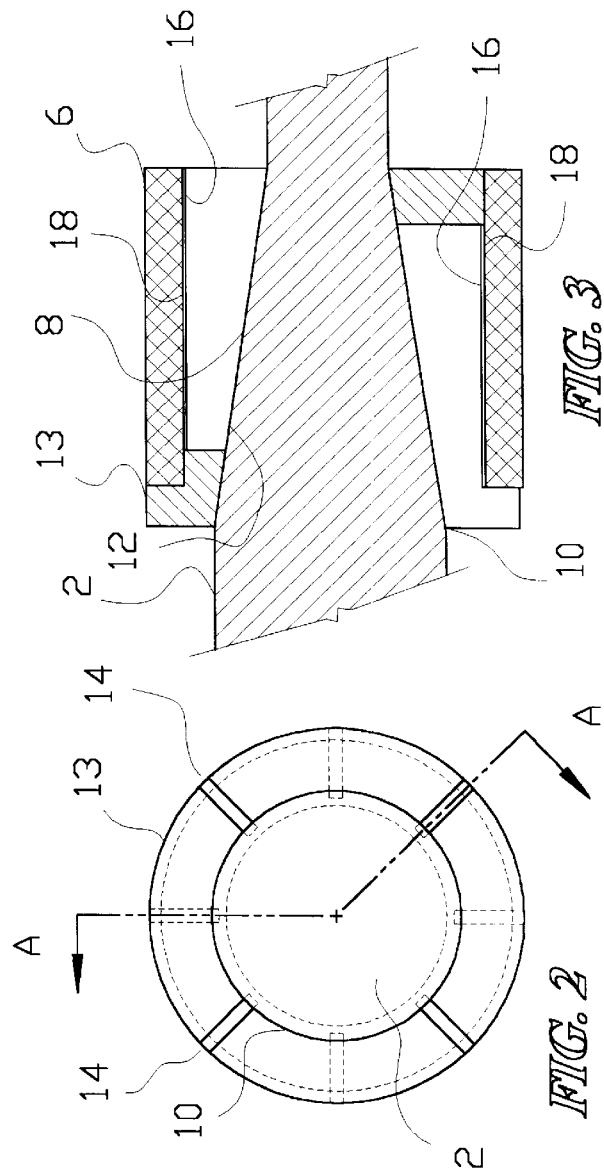

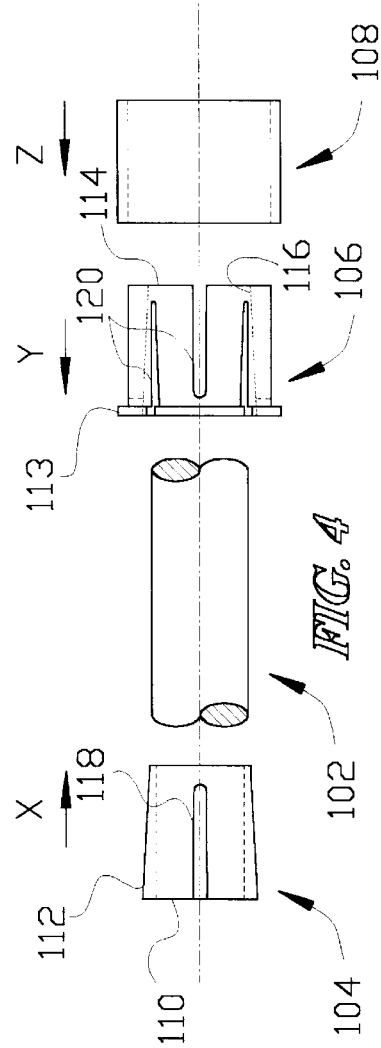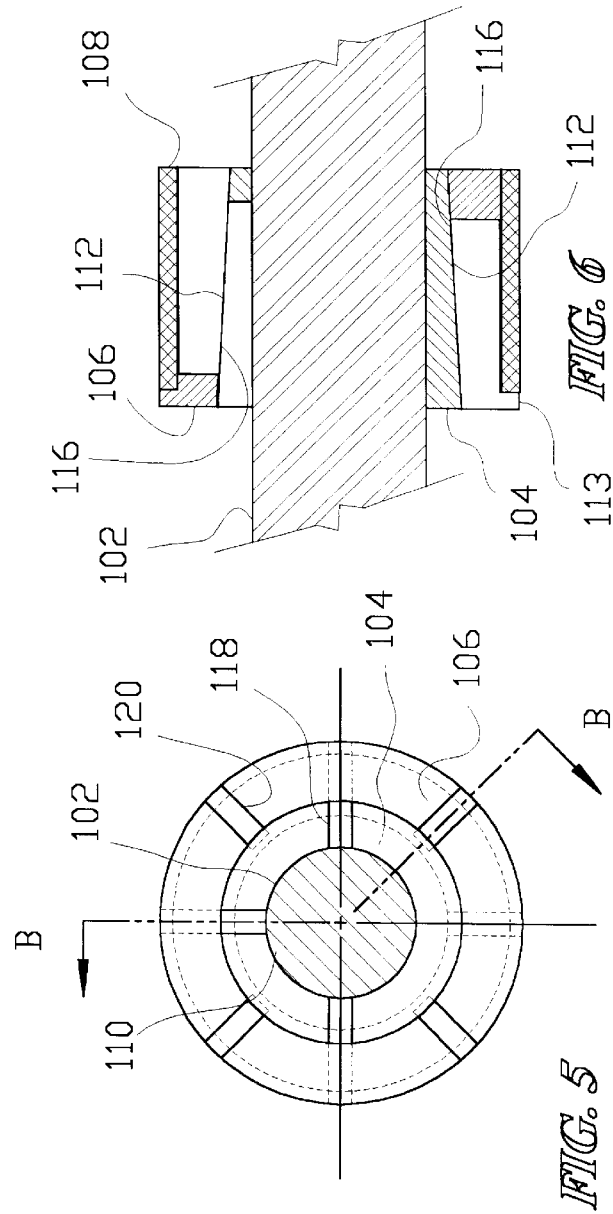

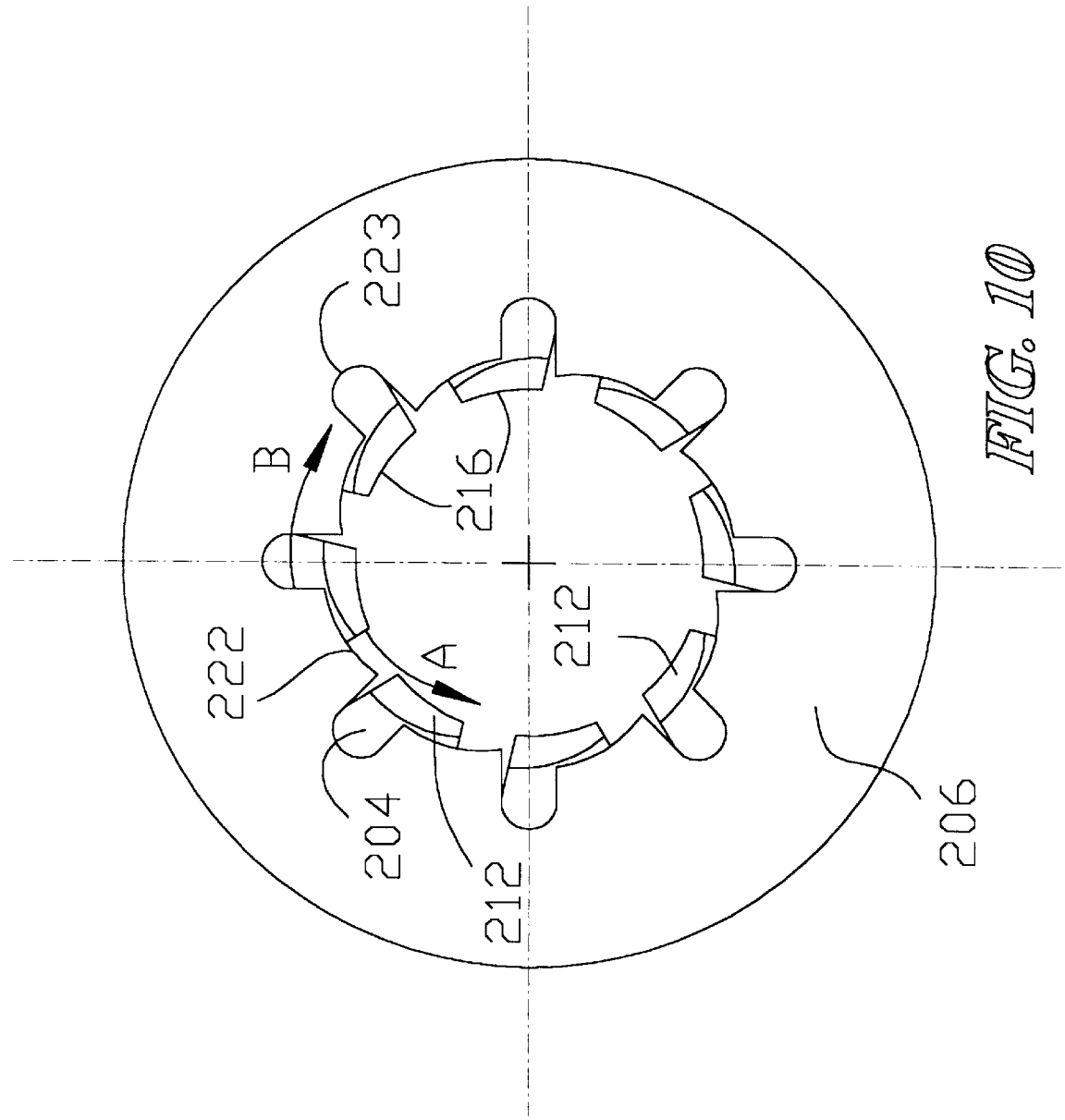

OPPOSING TAPER-FIT COLLAR FOR ATTACHING A TORQUE SENSING TRANSDUCER TO A ROTATABLE SHAFT

BACKGROUND OF THE INVENTION

The present invention relates to an opposing taper fit collar and an improved method of attaching a torque sensing transducer to a rotatable shaft. In a first two embodiments, an opposing taper fit collar is employed to attach a magnetostrictive metal tranducer sleeve to a rotatable shaft for use as a non-contacting magnetoelastic torque sensing transducer for providing a measure of the torque applied to the rotatable shaft. Another embodiment can be used for attaching a strain gage or other type torque sensing transducer to a shaft.

Previously, torque measurement was accomplished using contact type sensors such as a strain gauge, directly attached to the shaft where torque was to be measured. More recently, non-contact torque sensors of the magnetostrictive type have been developed for use with rotatable shafts. In these devices a circumferential transducer which is magnetically polarized in the circumferential direction and having an effective uniaxial magnetic anisotropy, is attached to the rotatable torqued member in such a way that torque applied to the shaft is transmitted to the transducer. The transducer produces a magnetic field which varies in response to the stress on the transducer. The torque on the transducer reorients the circumferential magnetic field, producing a helical magnetic orientation having both circumferential and axial components. A magnetic field vector sensor mounted in a fixed position relative to the transducer responds to the field arising from the axial component of the magnetization within the sleeve. The output of the sensor is proportional to the change in orientation of the magnetization in the transducer resulting from the torque applied to the shaft and transmitted to the transducer.

Establishing the correct magnetic anisotropy in the transducer is key to the operation of such torque sensors. For this, selection of the proper transducer material is critical. The material must be ferromagnetic and magnetostrictive in order that the orientation of the magnetization may be altered by the stresses associated with an applied torque. Typically, 18% nickel maraging steel has been used to construct the transducer sleeve, although other materials may also be appropriate depending on the application. Alternate materials include other nickel maraging steels, nickel-iron alloys, aluminum maraging steels, manganese maraging steels, permendur type alloys, martensitic stainless steel, ferritic stainless steel, precipitation hardening stainless steel, and amorphous and nanocrystalline materials.

Once the material for the transducer has been chosen, it must be endowed with the proper circular magnetic anisotropy. A number of methods for establishing magnetic anisotropy are known, most of which require physically working the material of the transducer. Some of the more common methods include: crystal anisotropy, directional order, magnetoelastic anisotropy, and proper shaping of the material. While all the above sources of magnetic anisotropy, and others, have possible applications in the field of non-contact torque sensors, the preferred source is magnetoelastic. In this situation the transducer sleeve is mounted to the shaft with a "press fit," a "shrink fit," or some other type of "interference fit." In any case, the result is that the inside diameter of the transducer sleeve is made smaller than the outside diameter of the shaft at the sensor interface. This construction places the transducer in circumferential tension, or "hoop stress." If the transducer is fabricated from a material having a positive magnetostriction, this tensile stress produces the desired circular magnetic anisotropy.

Regardless of how the uniaxial magnetic anisotropy is established, it is necessary to attach the transducer sleeve to the shaft where torque is to be measured. Since the transducer sleeve and the rotatable shaft must work as a mechanical unit, rigid attachment of the transducer sleeve to the shaft is crucial to proper operation if the sensor. Past sensors have sought to achieve this rigid attachment in a number of ways. Salient mating force distribution is one method that has been suggested. Using this method surface features are formed on the inner surface of the transducer sleeve and on the outer surface of the shaft. These surface features can range from mating profiles of the shaft and the transducer themselves (e.g. oval or triangular), to mating splines, knurls or teeth cut into both surfaces. Distributed transmission of force is another method of attaching the transducer which has been considered. This is achieved by friction or adhesive bonding of the transducer sleeve to the shaft. This later method is beneficial in that it lends itself to the interference fit described above for developing the proper magnetic anisotropy in the transducer sleeve.

A problem with sensing torque using the current generation of magnetostrictive torque sensing transducers is that the transducers will only work if the shaft is made from nonmagnetic materials. However, many applications which require torque sensing, such as electrical power steering systems for automobiles, require torque sensing on steel output shafts. In this case an inner shielding sleeve, or collar, is required to be inserted between the magnetic shaft and the magnetostrictive transducer sleeve. The addition of a shielding collar between the transducer and the output shaft presents a number of problems. Most significantly, adding the shielding collar complicates the assembly process of attaching the transducer to the shaft. The shielding collar together with the transducer must be interference fit onto the output shaft, and the proper "hoop stress" must be imparted to the transducer through the shielding collar. Torque from the output shaft must also be effectively and consistently transmitted through the shielding collar to the transducer, and no slippage or deformation of the shielding collar or the transducer must occur. In other words, the addition of an interposed shielding sleeve increases the assembly cost of the transducer/output shaft combination, and could decrease the reliability of the sensor. What is needed is an improved low cost method of attaching a torque sensing transducer sleeve of the magnetostrictive type to a magnetic shaft having a nonmagnetic shielding collar disposed therebetween. The attachment method must result in the proper circumferential tension or "hoop stress" being imparted to the transducer sleeve in order to establish an effective uniaxial magnetic anisotropy within the transducer for use in a torque sensing device.

SUMMARY OF THE INVENTION

A principal object of this invention is to provide an improved method for attaching a torque sensing transducer sleeve of the magnetostrictive type to a shaft.

Another object of the present invention is to provide a method of attaching a torque sensing transducer sleeve to an output shaft wherein an effective uniaxial magnetic anisotropy is established mechanically through magnetoelastic anisotropy.

Yet another object of the invention is to provide an opposing tapered fit collar for attaching a magnetostrictive type torque sensing transducer to a shaft.

An additional object of the present invention is to provide a simplified method of attaching a torque sensing transducer to a shaft wherein manufacturing and assembly costs are reduced.

A further object of the invention is to provide and improved attachment method wherein a circumferential "hoop stress" is imparted to the transducer.

A still further object of the invention is to provide a one piece tapered fit collar for attaching a torque sensing transducer to a shaft having a tapered portion. The tapered collar configured to impart circumferential "hoop stress" to the transducer.

Again, another object of the invention is to provide a two piece tapered fit collar for attaching a torque sensing transducer to a smooth shaft. The two piece collar being configured such that when assembled, the collar exerts "hoop stress" to the transducer.

These objects, as well as other improvements which will become apparent upon closer inspection of the preferred embodiments disclosed herein, are all met by the opposing taper-fit collar for attaching a magnetostrictive torque sensing transducer to a rotatable shaft set forth below. In the preferred embodiments, a shaft is provided on which torque is to be applied and measured. A magnetostrictive type transducer sleeve is then attached to the shaft by means of the taper-fit collar. The taper fit collar is made of a nonmagnetic material, and is shaped such that when the transducer sleeve and the taper-fit collar are positioned together over the shaft, the taper fit collar exerts circumferential tension on the transducer sleeve. The circumferential tension or "hoop stress" causes circular magnetic anisotropy within the transducer sleeve which can be used to measure torque applied to the shaft.

These and other features of the invention are set forth below in the following detailed description of the presently preferred embodiments.

BRIEF DESCRIPTION OF THE DRAWINGS

FIG. 1 is a plan view of the components comprising a first embodiment of the invention shown prior to final assembly;

FIG. 2 is an end view of the components in FIG. 1 shown after final assembly;

FIG. 3 is a section view of the final assembly of FIG. 2 taken along the line A—A;

FIG. 4 is a plan view of the components of a second embodiment of the invention shown prior to final assembly;

FIG. 5 is an end view of the components in FIG. 4 shown after final assembly;

FIG. 6 is a section view of the final assembly of FIG. 5 taken along the line B—B;

FIG. 10 shows the isolating collar of FIG. 8 and the locking member of FIG. 9 in their cooperating relationship for locking the collar to a shaft.

DETAILED DESCRIPTION OF THE PRESENTLY PREFERRED EMBODIMENTS

Figure 7:
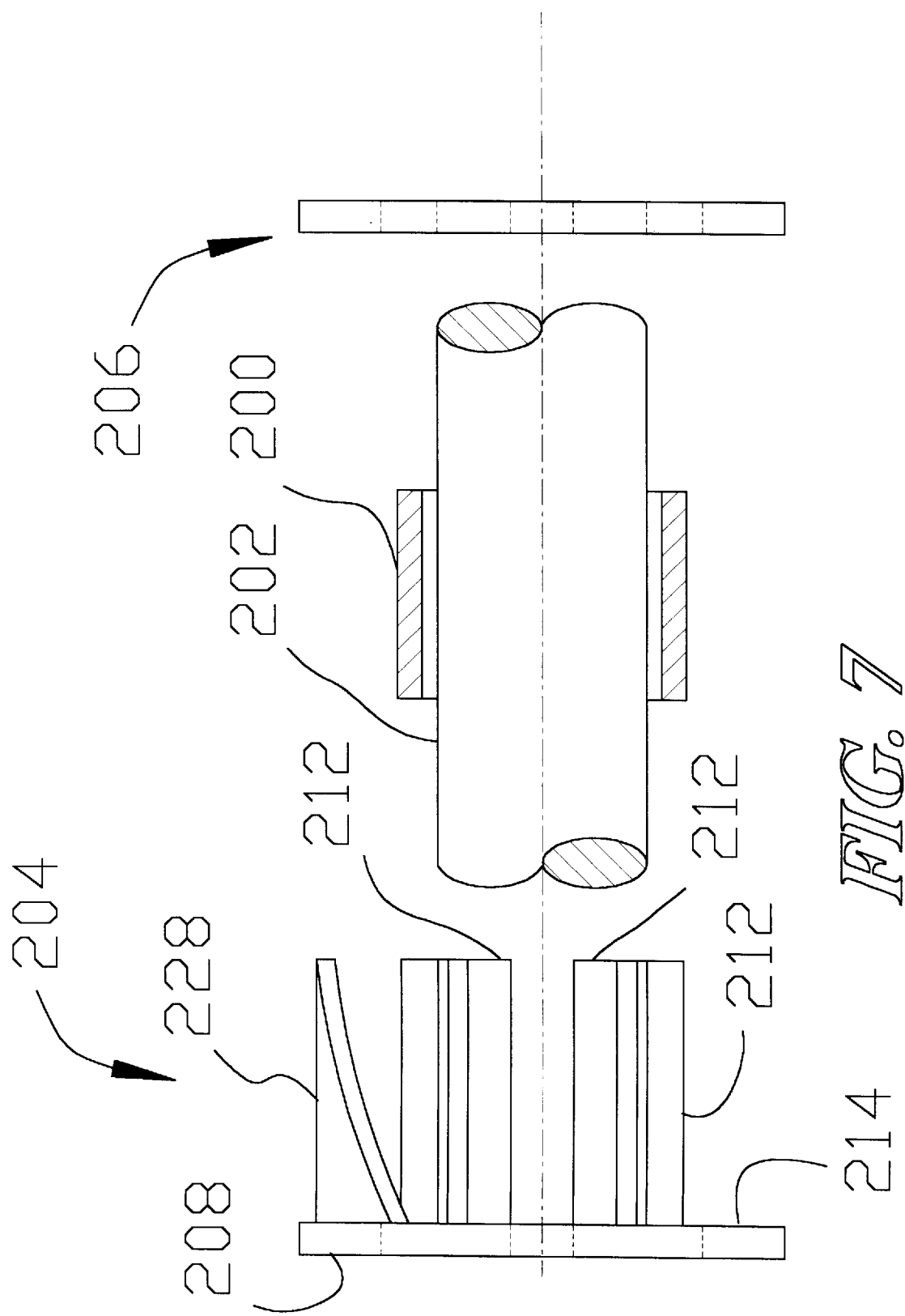
FIG. 7 is a plan view of the components of a third embodiment of the inventio shown prior to final assembly with the transducer sleeve shown in cross section.

The present invention relates to a mounting collar for attaching a magnetostrictive type torque sensing transducer sleeve to an output shaft where torque is to be measured, and a method of using the same. The mounting collar and attachment method results in a circumferential tension imparted to the transducer sleeve which gives rise to a uniaxial magnetic anisotropy in the transducer sleeve which can be used to monitor torque.

Referring to FIGS. 1, 2 and 3, a first embodiment of the invention is shown. In FIG. 1 a rotatable shaft 2, a nonmagnetic isolating collar 4, and a torque sensing transducer sleeve 6, are shown prior to final assembly. FIG. 2 shows an end view of the final assembly with the components in their working orientation. FIG. 3 is a section view of the final assembly taken along the line A—A in FIG. 2. As can best be seen in FIGS. 1 and 3, the shaft 2 is formed with a tapered section 8. The tapered section 8 is located at the position on the shaft 2 where the transducer sleeve 6 is to be mounted. The isolating collar 4 is formed with a tapered bore 10 extending axially through the collar. As a result, an inner surface 12 of the isolating collar 4 is angled relative to the shaft 2, the angle corresponding to the tapered portion 8 of the shaft 2. Additionally, the isolating collar 4 is also formed with a flanged edge 13 at the end of the collar corresponding to the larger end of the tapered bore 10. When the transducer sleeve 6 is positioned over the isolating collar 4, the flange 13 acts as a stop and prevents the transducer sleeve from sliding off the collar.

The shaft 2, isolating collar 4, and transducer sleeve 6 are assembled by sliding the transducer sleeve over the isolating collar and sliding the collar/transducer sleeve combination over the shaft 2 in the direction of arrow A. The isolating collar 4 and transducer sleeve 6 are then press fit onto the tapered portion 8 of the shaft 2. The inner surface 12 of the collar 4 engages the tapered portion 8 of the shaft 2 to form a tight fit between the shaft 2 and the isolating sleeve 6. Expansion relief slots 14 are formed in the collar 4 to allow the collar to expand radially as the collar is forced further onto the tapered portion 8 of the shaft 2.

As the collar 4 expands, the outer surface 16 of the collar engages the inner surface 18 of the transducer sleeve 6. When the isolating collar 4 and the transducer sleeve 6 are forced to their final position as shown in FIG. 3, the tapered portion 8 of the shaft 2 exerts a radial force on the isolating collar 4 which in turn exerts a radial force on the transducer sleeve 6. This outward radial force keeps the transducer sleeve 6 in circumferential tension or "hoop-stress", which creates the uniaxial magnetic anisotropy necessary to sense torque.

As noted, the isolating collar 4 must be made of a nonmagnetic material. It is also preferable that the isolating collar be made of material that is softer relative to the transducer sleeve 6 and the shaft 2. Softer material will tend to expand into any surface irregularities in both the transducer sleeve 6 and the shaft 2. This results in a very strong interface area providing good surface contact between both the shaft 2 and the transducer sleeve 6. It is presently contemplated that the isolating collar 4 be made of either aluminum or magnesium. In selecting the proper material it is critical that the isolating collar 4 be strong enough to survive the compression between the transducer sleeve 6 and the shaft 2, and provides adequate circumferential tension or "hoop stress" to establish sufficient magnetoelastic anisotropy within the transducer sleeve 6. Furthermore, the fit between the shaft 2, the isolating collar 4 and the transducer sleeve 6 must be such that torque applied to the shaft is translated through the isolating collar to the transducer sleeve. No amount of slippage or deformation at the component interfaces can be tolerated.

Referring now to FIGS. 4, 5 and 6, a second embodiment of the invention is shown. In FIG. 4 a rotatable shaft 102, a nonmagnetic isolating inner collar 104, a nonmagnetic isolating outer collar 106, and a torque sensing transducer sleeve 108, are shown prior to final assembly. FIG. 5 shows an end view of the final assembly with the components in their working orientation. FIG. 6 is a section view of the final assembly taken along the line B—B in FIG. 5. As can best be seen in FIGS. 4 and 6 the output shaft 102 of this embodiment has a constant diameter. The isolating collar is composed of two parts, an inner collar 104 and an outer collar 106. An axial bore 110 extends through the inner sleeve 104 parallel to the shaft 102. An outer surface 112 of the inner collar is tapered in a fashion similar to the tapered shaft of the previous embodiment. A tapered axial bore 114 extends through the outer collar 106. The angle of the inner surface 116 of the outer collar 106 corresponds to that of the outer surface 112 of the inner collar 104. Thus, when the two collars and the transducer sleeve are press fit together as indicated by arrows X, Y and Z, tapered surfaces 112, 114 slide over each other. The outer collar 106 tends to force the inner collar 104 inward against the shaft 102, and the inner collar 104 tends to force the outer collar 106 outward against the transducer sleeve 108. Longitudinal slots 118 in the inner collar 104 allow the inner collar to be more readily compressed against the shaft 102. Likewise, longitudinal slots 120 in the outer collar 106 allow the outer collar to be more readily expanded against the transducer sleeve 108. The compression of the inner collar 104, and the expansion of the outer collar 106 provide for a strong fit between the transducer sleeve 108, the inner and outer collars 104, 106 and the shaft 102. Torque applied to the shaft is efficiently transmitted through the inner and outer collar elements 104, 106 to the transducer sleeve 108 and no slippage or deformation occurs along the component interfaces. The outer isolating collar 106 includes a flanged edge 113 at the end of the collar corresponding to the larger end of the tapered bore 114. When the transducer sleeve 108 is positioned over the outer isolating collar 106, the flange 113 acts as a stop and prevents the transducer sleeve from sliding off the outer collar.

As with the first embodiment, proper selection of materials for the inner and outer collars is critical. The use of relatively soft materials for the collar as compared to the transducer sleeve and the shaft is equally important here. Aluminum and Magnesium collars are considered for this embodiment as well.

In both embodiments, the isolation collars can be formed using a thixotropic molding process where semi-liquid metal is injected into a mold. This process eliminates the requirement of machining the tapered surfaces on the isolating collars 12, 112, 116. Using this process also allows the transducer sleeves 6, 108 to be used as mold inserts. This eliminates an additional manufacturing step, namely the insertion of the collar into the sleeve. Thus, by employing this method, the costs of manufacturing and attaching the torque sensing transducer sleeve to the shaft are reduced.

Referring now to FIGS. 7,8,9, and 10, a third embodiment of the invention is shown. In this embodiment a strain gage or a transducer sleeve 200 is mounted to a shaft 202 by means of a collar 204 which is locked to the shaft by means of a cam locking member 206. While this description relates to mounting a transducer sleeve to shaft, it is to be understood that other types of transducers and equiment can be mounted to a shaft in a similar fashion. Specifically, a strain gage type sensor can be mounted between two of the collar/locking member assemblies descibed here.

Figure 8:
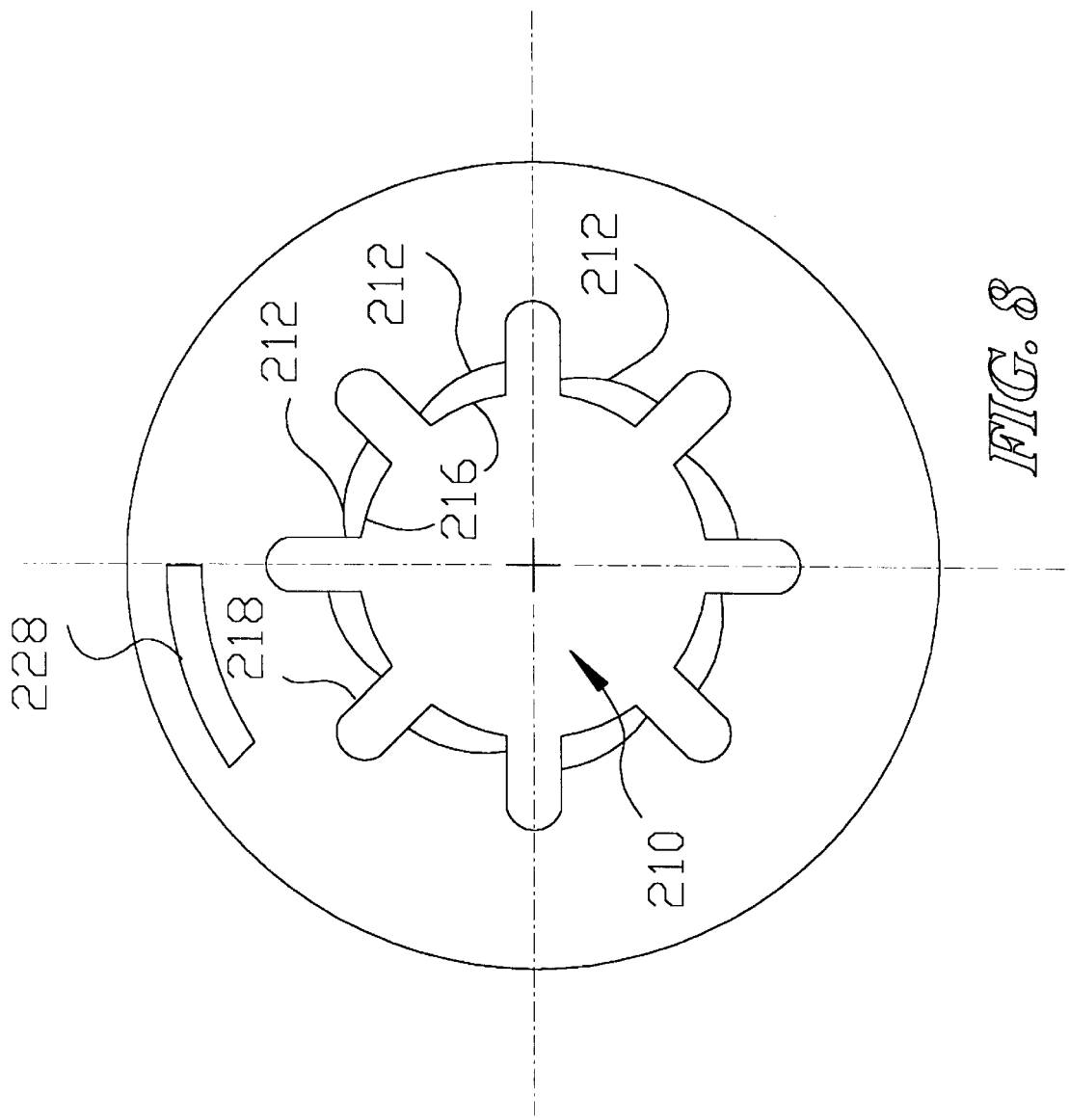
FIG. 8 is a side view of the isolating collar of the third embodiment of the invention.

As best seen in FIGS. 7 and 8, the collar 204 is formed of a disk like end plate 208 perpendicular to the shaft 202. A bore 210 extends through the end plate 208 allowing the end plate to slide over the shaft 202. Tapered wedge shaped vanes 212 are disposed around the bore 210 and extend inward from an inner surface 214 of the end plate 208. The inner surfaces 216 of the vanes 212 are curved forming circular arcs having the same radius as that of the shaft 202. Thus, when the inner collar 204 is slid over the shaft, the vanes 212 are in circumferential contact with the shaft 202. The vanes 212 are wedge shaped such that when looking down the vanes toward the inner surface 214 of the end plate 208, as shown in FIG. 8, the vanes 212 grow wider from one end to the other moving clockwise around the bore 210. Spaces separate the vanes 212, and corresponding alignment grooves 218 are formed in the end plate 208.

Figure 9:
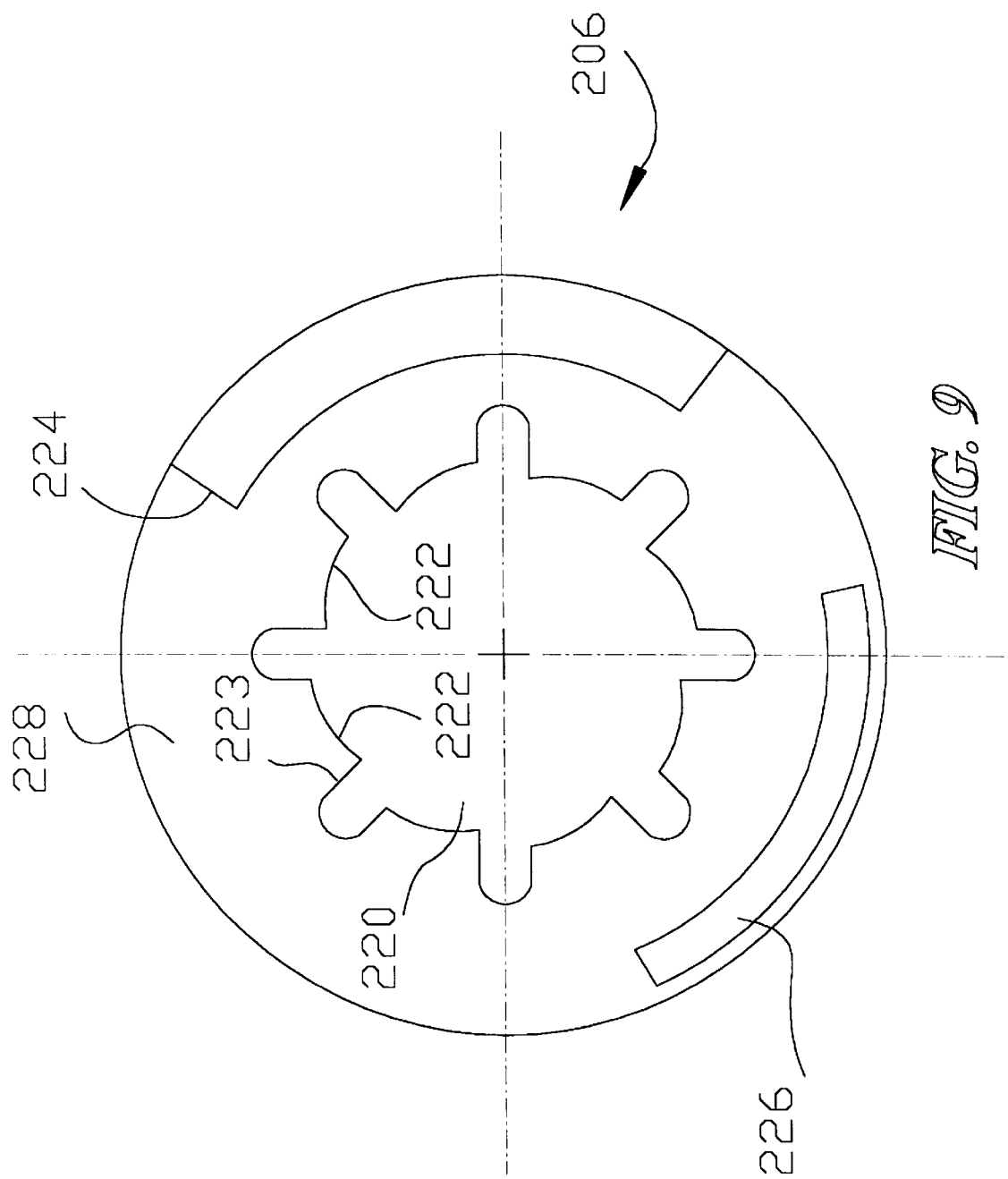
FIG. 9 is a side view of the locking member used in the third embodiment of the invention.

The locking member 206 is in the form of a disk which slides perpendicularly over the shaft 202. As can be seen in FIG. 9, the locking member 206 has an axial bore 220 with a number of wedge shaped cam surfaces 222 protruding therein. Alignment grooves 223 are formed in the locking member, separating the cam surfaces 222. The cam surface 222 are configured such that they cooperate with the wedge shaped vanes 212 of the collar 204. The collar 204 is placed on the shaft 202, and the transducer sleeve 200 is placed over the vanes 212. The vanes 212 are somewhat longer than the transducer sleeve 200 such that when the transducer sleeve is positioned against the end plate 208 of the collar 204, the vanes protrude out the other side of the transducer sleeve. The locking member 206 is then slid over the shaft 202 so that the cam surfaces 222 can engage the vanes 212 protruding from the transducer sleeve 200. Initially, when assembling the collar 204, as can best be seen in FIG. 10, the narrow portion of the cam surfaces 222 are aligned with the narrow portion of the wedge shaped vanes 212. This allows the locking member 206 to slide over the vanes 212 until it is brought into abutting contact with the transducer sleeve 200 (see FIG. 7). Once in position, the collar 204 and the locking member 206 can be twisted in opposite directions, as indicated by arrows A and B, to lock the entire assembly onto the shaft 202. As the two members are twisted, the wider portion of the cam surface 222 are brought into closer alignment with the wider portions of the wedge shaped vanes 212. This twisting action gives rise to an inward directed radial force where the cam surface 222 compress the vanes 212 against the shaft 202, locking the assembly in place.

It is further considered with this embodiment that the twisting action described above can be accomplished by means of a spring (not shown). FIG. 9 shows the locking member 206 formed with a shallow pocket 224 for accommodating a spring means. Additionally, a relief slot 226 is formed near the outer periphery of the locking member 206 for accommodating a post 228 protruding from the inner surface 214 of the collar 204. The post 228 and relief 226 slot are configured such that when the collar 204 and the locking member 206 are rotated relative to one another, the post 228 rotates around the locking member guided by the relief slot 226. A first end of the spring means is attached to the spring pocket 224, and a second end of the spring means is attached to the post 228. The spring means is biased in a manner such that the spring means causes the collar 204 and the locking member 206 to rotate relative to one another in the direction of arrows A and B, which tends to lock the assembly to the shaft 202. Thus, the spring helps to maintain a tight fit between the collar 204 and the shaft 202.

In this way, a torque sensing transducer sleeve of the magnetostrictive type is attached to a rotatable shaft where torque is to be measured. A shaft is provided on which torque is to be applied and measured. A transducer sleeve of the magnetostrictive type for measuring the torque is attached to the shaft with a nonmagnetic collar interposed between the shaft and the transducer sleeve. The nonmagnetic collar is formed having a shape such that when the transducer sleeve, and the collar are properly positioned on the shaft, the nonmagnetic sleeve exerts circumferential tension on the transducer sleeve producing circular magnetic anisotropy within the transducer sleeve.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

What is claimed is:

1. A torque sensor transducer assembly comprising:
   a rotatable shaft to which torque is to be imparted and measured:
   a cylindrical magnetostrictive torque sensing-transducer sleeve disposed around a portion of the shaft;
   a mounting collar disposed between the shaft and the transducer sleeve, the mounting collar further comprising:
     a first end and a second end;
     a first outer surface for engaging the torque sensing transducer sleeve;
     a first inner surface for engaging the shaft;
     a tapered first surface for expanding the collar against the transducer sleeve, and compressing the collar against the shaft; and
     the outward expansion of the mounting collar generating circumferential tension within the transducer sleeve, thereby creating a circularly polarized magnetic anisotropy therein.

2. The torque sensor transducer assembly of claim 1 further comprising a number of expandable tabs disposed about said first and second ends of the mounting collar, defining a number of expansion relief slots between said tabs.

3. The torque sensor transducer assembly of claim 1 wherein said mounting collar is formed of a softer material relative to said transducer sleeve and said shaft.

4. The torque sensor transducer assembly of claim 1 wherein said transducer sleeve is formed from magnetoelastic maraging steel.

5. The torque sensor transducer assembly of claim 1 wherein said inner surface defines a tapered bore for engaging a correspondingly opposed tapered second surface on said shaft, said tapered bore and said tapered shaft comprising the tapered surface for expanding the mounting collar against the transducer sleeve, and compressing the mounting collar against the shaft.

6. The torque sensor transducer assembly of claim 5 wherein said mounting collar is formed of a nonmagnetic material.

7. The torque sensor transducer assembly of claim 1 wherein said mounting collar further comprises:
   an inner collar having a tapered second outer surface;
   an outer collar having a second inner surface, said second inner surface defining a tapered bore opposing said tapered second outer surface;
   said inner collar and said outer collar being configured such that said outer collar being press fit over said inner collar said second outer surface and said second inner surface mutually oppose one another, said outer collar acting to compress said inner collar onto said shaft, and said inner collar acting to radially expand said outer collar.

8. The torque sensor transducer assembly of claim 7 wherein said outer collar further comprises first and second ends, said ends being divided into a number of expandable tabs, said tabs defining a number of expansion relief slots.

9. The torque sensor transducer assembly of claim 7 wherein said inner collar further comprises a first end divided into a number of compressible tabs, said tabs defining a number of compression relief slots.

10. The torque sensor transducer assembly of claim 7 wherein at least one of said inner collar and said outer collar are formed of a nonmagnetic material.

11. The torque sensor transducer assembly of claim 7 wherein said inner collar, and said outer collar are formed of a softer material relative to said transducer sleeve and said shaft.

12. A method for attaching a torque sensing transducer sleeve of the magnetostrictive type to a shaft, comprising the steps of:
   a) providing a shaft on which torque is to be applied and measured;
   b) providing a magnetostrictive transducer sleeve for measuring the torque applied to said shaft;
   c) providing a nonmagnetic collar to be interposed between said shaft and said transducer sleeve, said nonmagnetic collar having a shape such that when said transducer sleeve and said nonmagnetic collar are properly positioned on said shaft, the nonmagnetic collar exerts circumferential tension on the transducer sleeve, establishing a circumferential magnetic anisotropy therein; and
   d) positioning said transducer sleeve and said nonmagnetic collar on said shaft.

13. The method of claim 12 wherein said shaft is formed with a tapered portion corresponding to a point where said transducer sleeve is to be positioned, and said nonmagnetic collar defining a tapered bore corresponding to said tapered portion of said shaft.

14. The method of claim 13 wherein said nonmagnetic collar expands radially when positioned over said tapered portion of said shaft, providing said circumferential tension within said transducer sleeve.

15. The method of claim 12 wherein said nonmagnetic collar defines at least one expansion relief slot.

16. The method of claim 12 wherein said nonmagnetic collar is comprised of an inner collar having a first tapered surface, and an outer cylindrical member having a second tapered surface, said first tapered surface and said second tapered surface being mutually opposed to one another such that when said outer collar member is positioned over said inner collar member, said inner collar tends to radially expand said outer collar.

17. The method of claim 12 wherein said nonmagnetic collar being formed of a softer material relative to said shaft and said transducer sleeve.

18. A shaft assembly for use in an automotive, power steering system comprising:
   a torque bearing rotatable shaft;
   a magnetostrictive torque sensing transducer sleeve disposed around the shaft;
   a nonmagnetic isolating collar disposed between transducer sleeve and the shaft; and at least two mutual opposing tapered surfaces associated with at least one of the collar and the shaft for exerting a radial force against the transducer sleeve, the radial force against the transducer sleeve establishing a circular magnetic anisotropy therein.

19. The shaft assembly of claim 18 wherein said at least two mutual opposing tapered surfaces comprise:

a first tapered surface formed on said shaft; and a second tapered surface defining a tapered bore through said nonmagnetic isolating collar.

20. The shaft assembly of claim 18 wherein said isolating collar comprises an inner collar and an outer collar, said at least two mutual opposing tapered surfaces being disposed between said inner and outer collars.

* * * * *